United States Patent [19]
Mazzei

[11] Patent Number: 5,674,312
[45] Date of Patent: Oct. 7, 1997

[54] INJECTION OF SOLUBLE GAS IN A LIQUID STREAM AND REMOVAL OF RESIDUAL UNDISSOLVED GAS

[75] Inventor: Angelo L. Mazzei, Bakersfield, Calif.

[73] Assignee: GDT Corporation, Phoenix, Ariz.

[21] Appl. No.: 627,798

[22] Filed: Mar. 26, 1996

Related U.S. Application Data

[63] Continuation of Ser. No. 274,539, Jul. 13, 1994, abandoned.

[51] Int. Cl.[6] .................................................. B01D 19/00
[52] U.S. Cl. ........................ 95/261; 55/261; 55/468; 96/202; 96/209; 210/512.1; 210/750
[58] Field of Search .................... 55/261, 266, 468; 95/261; 96/202, 206, 209, 216; 210/512.1, 750

[56] References Cited

U.S. PATENT DOCUMENTS

| | | | |
|---|---|---|---|
| 1,598,787 | 9/1926 | Shields et al. | 55/261 |
| 2,757,582 | 8/1956 | Freeman et al. | 95/261 |
| 3,007,542 | 11/1961 | Giampapa et al. | 95/261 |
| 3,070,935 | 1/1963 | De Leon | 96/206 |
| 3,201,919 | 8/1965 | Long | 95/261 |
| 3,358,425 | 12/1967 | Burnham, Sr. | 55/468 |
| 4,123,800 | 10/1978 | Mazzei | 366/150 |
| 5,314,613 | 5/1994 | Russo | 96/202 |
| 5,338,341 | 8/1994 | Mazzei et al. | 96/208 |
| 5,403,475 | 4/1995 | Allen | 96/202 |

FOREIGN PATENT DOCUMENTS

| 1421363 | 9/1988 | U.S.S.R. | 96/209 |
|---|---|---|---|

*Primary Examiner*—C. Scott Bushey
*Attorney, Agent, or Firm*—Donald D. Mon

[57] ABSTRACT

Apparatus and process for injecting high concentrations of a treatment gas into a liquid stream which is devoid of undissolved gas or a gas phase. The liquid stream is passed through a gas inducing injector to receive treatment gas, and then is passed through a centrifugal liquid/gas separator from which entrained gases and liquid with dissolved treatment gases are separately withdrawn.

9 Claims, 5 Drawing Sheets

INJECTION OF SOLUBLE GAS IN A LIQUID STREAM AND REMOVAL OF RESIDUAL UNDISSOLVED GAS

This is a continuation of application Ser. No. 08/274,539 filed on Jul. 13, 1994 now abandoned.

SPECIFICATION

1. Field of the Invention

A system to inject gas into a pressurized flowing liquid stream, in which at least some of said gas will be transferred and dissolved into the liquid, and then to remove residual undissolved (entrained) gas from the stream.

2. Background of the Invention

The injection of liquids into liquid streams using an injector is well-known. Such systems are widely used in the agricultural field to inject fertilizers and insecticides into a pressurized water stream of irrigation systems. Injectors for this purpose are generally plumbed into a side branch of the main conduit. They have a throat in which a negative pressure is developed by the water flowing through it. The additive is fed into the stream at the throat. The branch conduit returns to the major conduit where it mixes into the total flow. Alternatively, the injector may be plumbed directly into the main conduit, but especially in larger installations a branch conduit will be preferred.

Injectors for this application have long been known. U.S. Pat. No. 4,123,800 to Angelo Mazzei, the inventor herein, shows an injector that has been widely used in this field for many years.

Over the years it has been learned that an injector of this type is also suitable for adding gases to the liquid stream. In this application it shares the advantages it provides for injecting liquids into a liquid stream, namely aggressive mixing, and low consumption of energy. Its energy is derived from the pressure drop through the injector. Obviously the pressure drop must be such that the additive laden stream can re-enter the major conduit. In some simpler systems, the injector may be plumbed directly into the major conduit itself. If it is provided in a branched conduit, then the branch conduit must be provided with a pressure booster such as a pump, or a differential pressure must be produced in the main conduit, perhaps by means of a flow restriction.

Examples of useful gases which can usefully be injected are air, chlorine, oxygen, and ozone. Applications vary from small installations such as home spas and swimming pools to city and regional water supplies, as well as to irrigation systems and aquaculture applications.

Some gases are more soluble than others, i.e. ozone is more soluble than air.

The injection of these gases, while beneficial for their intended chemical effects, has not been without complications. For example, the discharge of ozone into the atmosphere is very strictly regulated. Excess ozone which is not dissolved in the water is not permitted to be discharged into the atmosphere. To comply with this limitation, systems generally utilize ozone concentrations at a level to enable the majority of the ozone to be dissolved in the time permitted by the parameters of the system. The advantages of using higher percentages of ozone, for example 10% to 15%, are forfeited unless greater pressure and better gas to liquid interfacing methods are utilized. Considerations of Henry's Law shows that a higher concentration of ozone will result in a much higher soluability of ozone in the stream than ozone from a less concentrated ozone- gas mixture. Also, the higher the stream pressure, the higher the transfer and dissolved ozone capability (super saturation). The generation of excess ozone is not an especially great cost compared to the advantages of using a more concentrated ozone gas supply.

In water treatment systems, it is desirable to inject ozone, maximize the ozone transfer into the water, allow the dissolved ozone to remain in the water but remove the undissolved gases (entrained) from the water. Once this phase of the process is completed, the dissolved ozone remains in the water for a specified time period depending on the treatment requirements.

It is important once the gas is injected into the water and the transfer of the desirable gas has taken place (dissolved), that the entrained gases be removed from the stream to prevent air displacement within the conduit and other problems associated with gas/water mixtures. This is an especially troublesome situation in large-scale installations such as swimming pools, ponds and water works systems.

These same circumstances pertain when undissolved troublesome gases, some as benign as air and oxygen, and others as troublesome as ozone, methane, and hydrogen sulfide, are entrained with air in the stream flow where they plague components such as pumps and delivery systems.

It is an object of this invention to provide a system in which a gas is injected into the stream flow, after which the parameters of the system enable the transfer of the desired gas to be dissolved, and in which some may not be dissolved, thereafter passing the flow through a de-gassing device to separate the (entrained) undissolved gases for further disposition such as to the atmosphere or to a means to destroy or recover the objectionable gases.

As a consequence, a treated stream will be produced which is substantially free of undesirable entrained gases, but which contains useful quantities of a dissolved gas. It will be substantially free of air bubbles. It will thereby provide an optimally treated stream, and in many applications such as spas, swimming pools and aquariums, a more aesthetically pleasing body of water.

It is instructive to note that when oxygen (instead of ozone) is the gas to be dissolved, this system enables the transfer of as much as 85% of the oxygen gas supplied. Existing systems are not known to the inventor which enable mope than about 55% transfer. When ozone is used, transfer of as much as 99% has been achieved.

BRIEF DESCRIPTION OF THE INVENTION

A pressurized flowing liquid stream system includes injector means for injecting gases into a main stream or into a branch stream returning to the main stream. Degassing means is plumbed into said system sufficiently downstream from said injector that a useful amount of said gas can be dissolved in the main stream. The major amount of solution occurs in the injection throat, although some additional solution occurs downstream from it. The degassing means strips undissolved gases from the stream and directs them to a place for suitable disposal, and also directs the stream to its point of use.

According to a preferred but optional feature of the invention, the degassing means is a centrifugal type which tends to separate the gases from the liquid as the consequence of density difference.

According to still another preferred but optional feature of the invention, a constricting nozzle can be plumbed into the system between the injector and the degasser, briefly to constrict the stream. The liquid is not compressible, but the gases, are. As a consequence, during this event an increased amount of gas will go into solution. It is emphasized that the object of this invention is to end up with a stream that has maximized dissolved gases, and minimized entrained gases.

The above and other features of this invention will be fully understood from the following detailed description and the accompanying drawings in which:

DETAILED DESCRIPTION OF THE INVENTION

The operative events necessary for this invention occur in a fully-contained pressurized system. While the treated liquid will eventually emerge into a region at a lesser, perhaps atmospheric, pressure, the gases intended to be dissolved will be brought into a pressurized system through an injector, and the residual gases will be separated from the liquid, both times at system pressure. At their prevailing pressure, the extracted residual gases will be vented to atmosphere or to reprocessing, and the liquid will continue in its pressurized flow either to rejoin a main stream, or itself to flow to a point of discharge.

Figure 1:
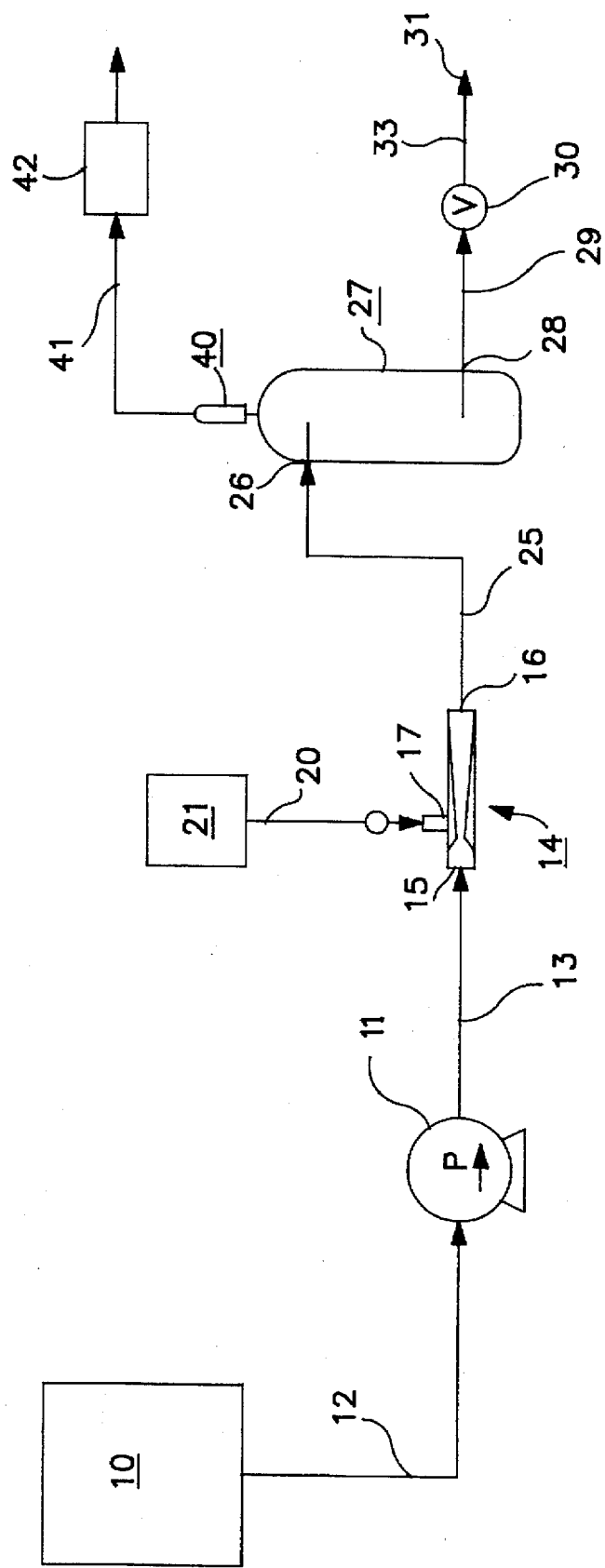
FIG. 1 is a system diagram showing the simplest and presently preferred embodiment of the invention.

The simplest embodiment of the invention is shown in FIG. 1, where the entire main stream of liquid is passed through both an injector and a degassing separator. As will later be shown, treatment of only a portion of the total stream can often provide sufficient dissolved gas for the entire stream after it is returned to the main stream. In either situation, the components and their functions will be identical.

A liquid supply 10 may be such as a well, pond, reservoir or main supply which supplies liquid (usually Water) for treatment. Pump 11 is a booster or supply pump to assure that the downstream system is supplied with liquid at the necessary system pressure.

Conduit 12 conveys liquid to pump 11. Conduit 13 conveys liquid to an injector 14. Injector 14 is shown in full detail in FIG. 4. For purposes of this introductory disclosure, the injector is shown only with an inlet port 15, an outlet port 16, and an injector port 17. A conduit 20 conveys gases from a gas supply 21 to injector port 17.

A conduit 25 conveys liquid from outlet port 16 to an inlet port 26 of a de-gassing separator 27. The de-gassing separator has a liquid outlet port 28 which discharges through conduit 29 to back pressure regulator 30. The pressure regulator maintains a suitable back pressure in the system and discharges to a point of use 31 through a conduit 33. The point of use may be such as a pump, a pond, a pressurized water distribution system, or any other place where suitably treated water is desired for use or for storage.

A de-gasser relief valve 40 is fitted to the degassing separator to release accumulated gas. Valve 40 will ordinarily be responsive to the relative amounts of gas and liquid in the separator. It will release extracted gas through conduit 41 to atmosphere if only gases which are properly discharged to atmosphere are involved. If, however the separated gases are objectionable, then conduit 41 will discharge into a recovery or treatment system 42. For example, if ozone is one of the recovered gases, then system 42 will utilize an ozone destructor. Other gases will require different recovery treatments.

Figure 2:
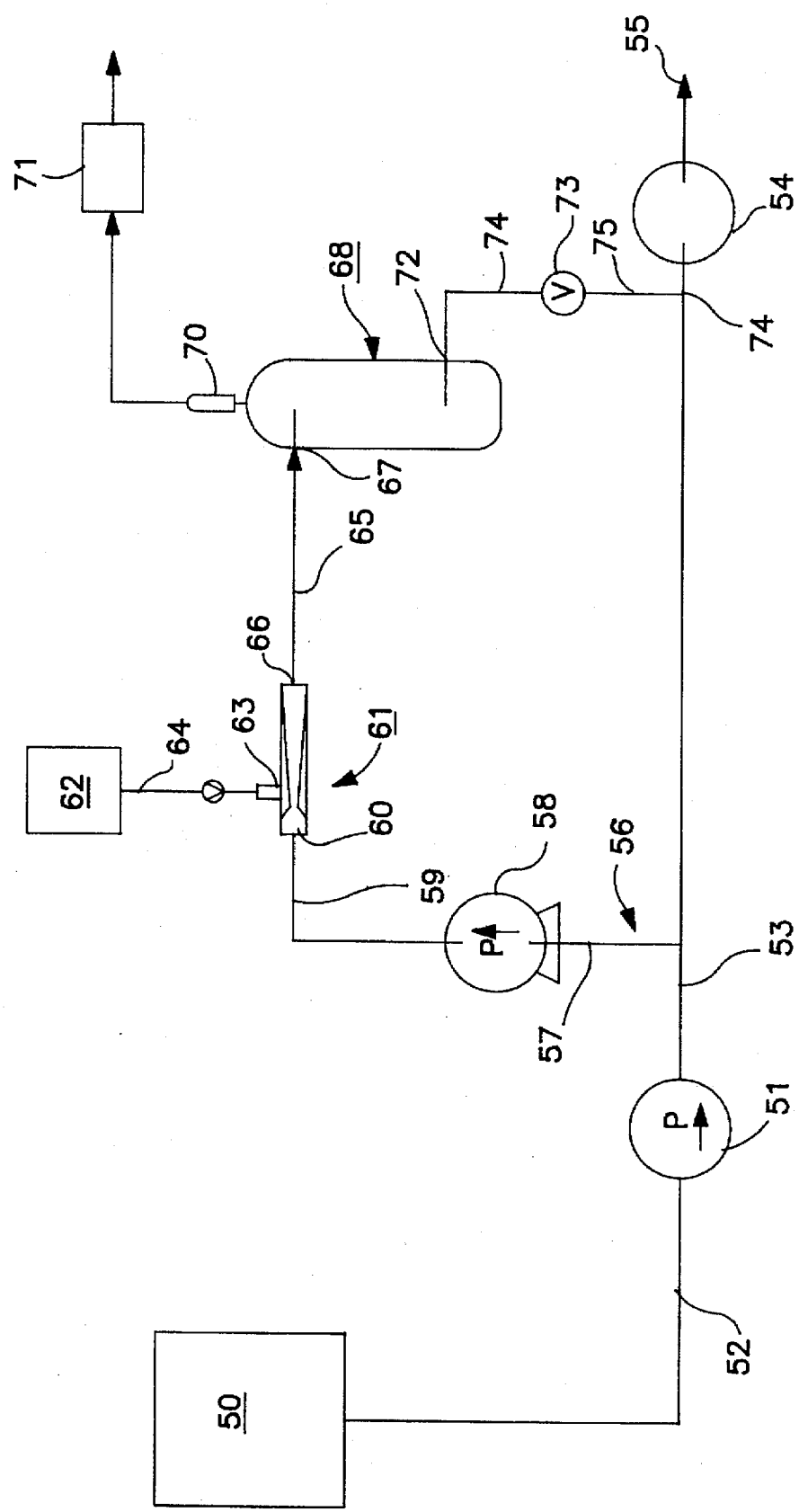
FIG. 2 is a system diagram of another embodiment of the invention.

FIG. 2 shows a modified system. In this embodiment, only a portion of the full stream is treated and degassed, while in the system of FIG. 1 the entire stream is treated and degassed. If the liquid from the liquid supply contains little or no free gas, then there is an evident economy in providing a side stream in which gases to be dissolved and also gases to be separated are processed in a lesser volume of liquid.

A liquid supply 50 supplies liquid to a pump 51 through conduit 52. Pump 51 supplies liquid under pressure to a main conduit 53. Main conduit in turn discharges to a pressure regulator 54. The pressure regulator discharges to a point of use 55.

This embodiment differs from that of FIG. 1 by providing a branch circuit 56 including a branch conduit 57 which connects to a booster pump 58. Booster pump 58 discharges through conduit 59 to the inlet port 60 of an injector 61.

A gas supply 62 is connected to an injector port 63 of the injector by conduit 64. A conduit 65 connects outlet port 66 of the injector to the inlet port 67 of a degassing separator 68.

A degasser relief valve 70 on the degassing separator discharges to a treatment and recovery system 71.

Outlet port 72 of the degassing separator is connected to a back pressure regulator valve 73 by conduit 74, and in turn is connected by conduit 75 to main conduit 53. Back pressure regulator valve 73 may not be needed if instead a regulator valve is placed in the main conduit downstream from junction 74 as in FIG. 1.

Figure 3:
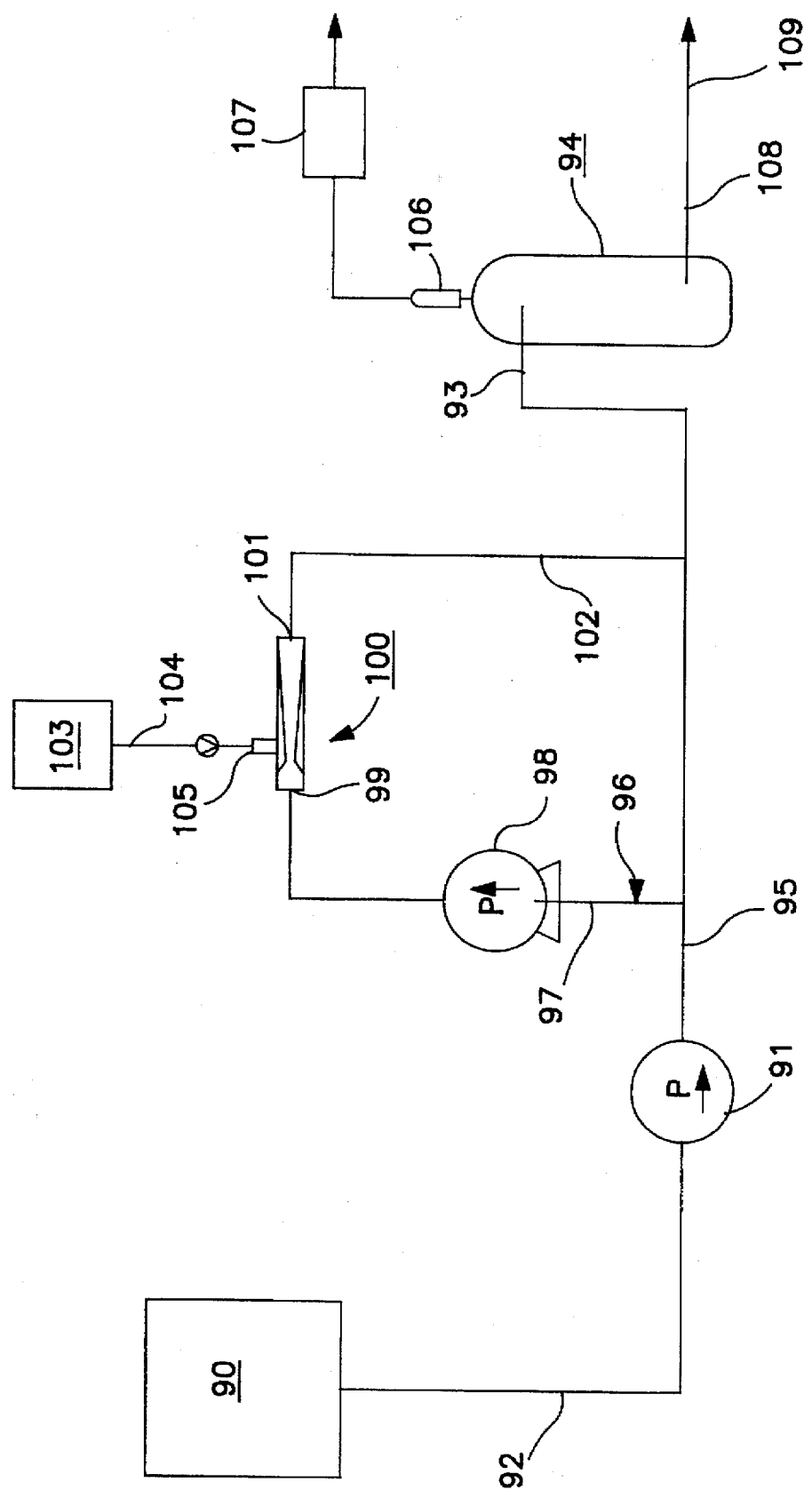
FIG. 3 is a system diagram of yet another embodiment of the invention.

There are circumstances where the full stream should be degassed, but in which only a portion of it needs to be treated in order to supply adequate gas to be dissolved for the entire stream. This will usually be the situation where the main stream already contains considerable undissolved gases as bubbles. FIG. 3 shows such a system.

A liquid supply 90 supplies liquid to a pump 91 through conduit 91. Pump 91 discharges a main stream to the inlet port 93 of a degassing separator 94 through main conduit 95.

A branch circuit 96 includes a conduit 97 branching from main conduit 95. A booster pump 98 receives liquid from conduit 97 and discharges liquid under pressure to inlet port 99 of an injector 100. Outlet port 101 of the injector is connected to main conduct 95 by conduit 102.

Gas supply 103 is connected by conduit 104 to injector port 105 of the injector.

A degasser relief valve 106 discharges gas from the degassing separator to a treatment or recovery system 107.

Outlet port 108 of degassing separator 94 discharges through conduit 109 to a point of use.

The systems of FIGS. 1–3 utilize common components, which will differ only in size, not in intended purpose or general structure.

Speaking generally pumps 11, 51 and 91 will not be needed if the liquid supply already is sufficiently pressurized, as it often will be. An example is a reservoir at a sufficient elevation. Generally a pump of this kind will be present somewhere upstream.

In the systems of FIGS. 2 and 3, a pump 58 and 98 will usually be provided in order that at the outlet part of the injector the stream will have sufficient pressure that it can re-enter the main stream.

Alternatively, should a pump at this point be undesirable, a restrictor (not shown) can be placed in the main conduit downstream from the entry junction of the branch conduit. Then the pressure drop across the injector should be equal to the pressure drop across the restrictor. For some uses, the loss of energy in the restrictor is justified by eliminating the need for a powered pump in the branch circuit or the presence of excessive available pressures in the system.

The gas supply in any of the embodiments need not be pressurized and usually is not, because the injector draws a sub-atmospheric pressure—a vacuum. Useful sources are tank gases such as chlorine mixed with air, or an ozone generator which produces a mixture of air and ozone. A distinct advantage of this invention is that ozone can be used in unusually high concentrations, such as 15%, rather than lower concentrations on the order of 2% to 6%, which is all that prior systems can accommodate and remain effective.

The injector used in all embodiments of this invention is the type which draws a vacuum when water flows through its throat at a sufficient velocity. This is a distinctly different device than flow measuring venturi-type devices, wherein only a reduced pressure is developed in the throat to be compared with another pressure. The objective of the injectors used in this invention is to draw a fluid—either gas or liquid—into a flowing stream in proportion to the mass flow through its throat.

Injectors useful in this invention are shown in Mazzei U.S. Pat. No. 4,123,800. This patent is incorporated herein by reference in its entirety for its showing of the construction of a suitable injector.

Figure 5:
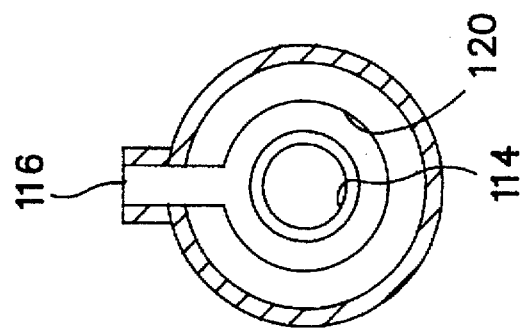
FIG. 5 is a cross-section taken at line 5—5 in FIG. 4.
Figure 4:
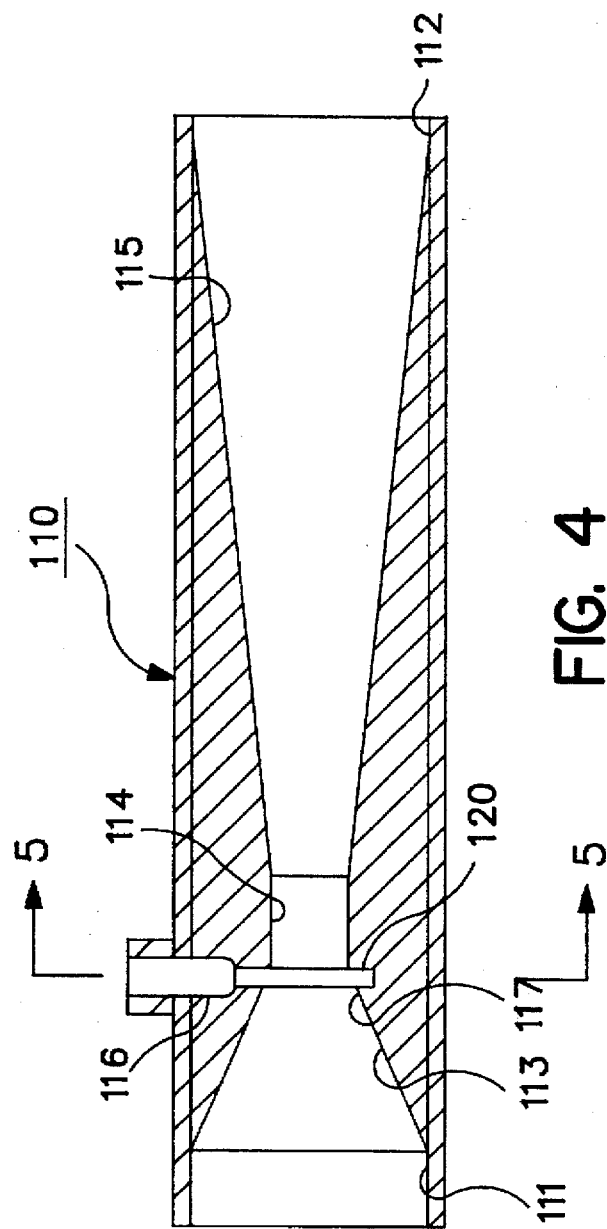
FIG. 4 is an axial cross-section of an injector useful in this invention.

A typical injector 110 is shown in full detail in FIG. 4. It includes an inlet section ill, an outlet section 112, and between sections 111 and 112, a constricting section 113, a generally cylindrical throat section 114, and a gradually increasing enlarging section 115. An injector port 115 enters the throat section downstream from the constricting section, preferably very close to the intersection 117 of the constricting section and the throat section. This placement, next to the generally frusto-conical constricting section, results in a tendency of the stream to "overshoot" the injector port, creating a very low, sub-atmospheric pressure at the injector port. The injector port enters the throat in a series of openings, or in a peripheral groove 120 as shown in FIG. 5.

Although any injector can be used which draws a vacuum, optimum injectors are shown in the Mazzei patent and in the drawing in this application. These are sold by Mazzei Injector Corporation, 500 Rooster Drive, Bakersfield, Calif. 93307.

Figure 9:
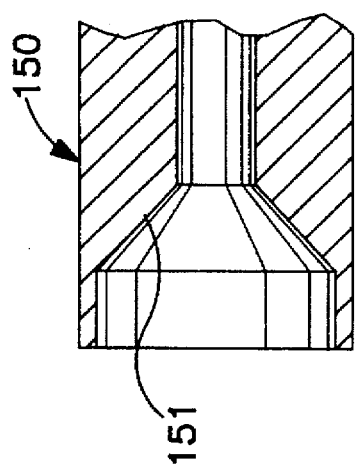
FIG. 9 is a cross-section of an optional constricting nozzle.
Figure 7:
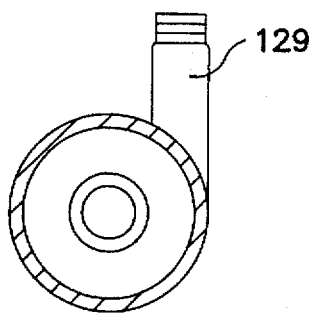
FIG. 7 is a cross-section taken at line 7—7 in FIG. 6.
Figure 8:
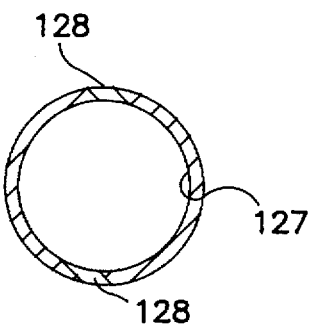
FIG. 8 is a cross-section taken at line 8—8 in FIG. 6.

While any degassing separator may be used which can operate in a pressurized system, an optimal device is shown in Mazzei's U.S. Pat. No. 5,338,341, filed Jun. 4, 1993, which is incorporated herein by reference in its entirety for its showing of the construction and operation of such a separator, which is also shown in FIGS. 7–9 herein. Degassing separators of this type are available from Mazzei Injector Corporation, 500 Rooster Drive, Bakersfield, Calif. 93307.

Figure 6:
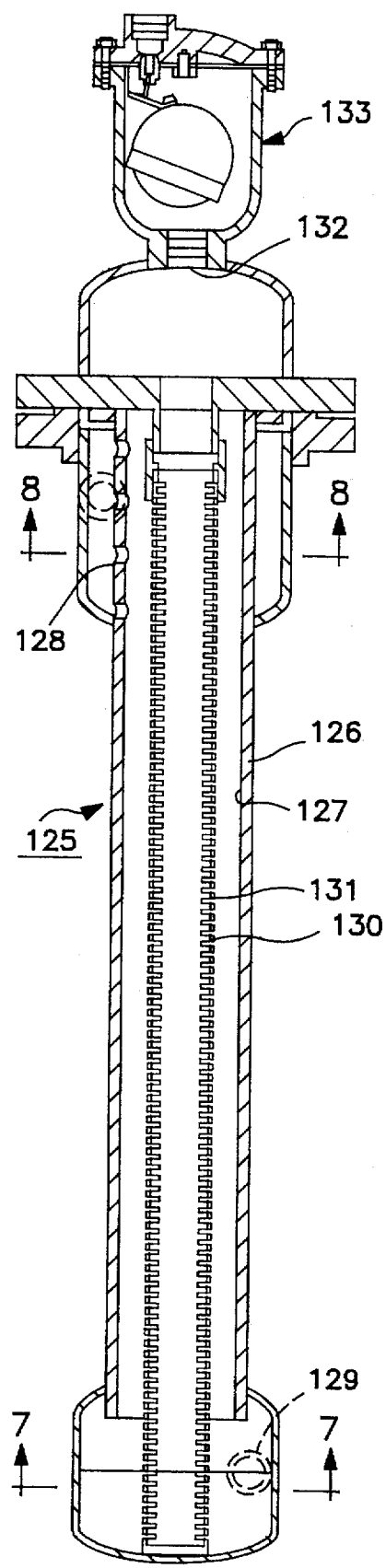
FIG. 6 is an axial cross-section of a degassing separator useful in this invention.

A best shown in FIG. 6, a degassing separator 125 includes a case 126 having a cylindrical inner chamber 127. A group of tangentially-directed nozzles 128 open into the chamber near its upper end so as to produce a downwardly-whirling stream flowing toward an exit port 129 at the lower end of the case.

A gas separator tube 130 extends axially downward into chamber 127. It is cylindrical and hollow, and has a plurality of slots 131 through it. Gas outlet port 132 exits at the upper end of the case. A degasset relief valve 133 controls the exit of gases. It is sensitive to the water level in the separator, and prevents the case from filling with gas.

In operation, the centrifugal force of the whirling stream causes gas bubbles to migrate toward the center, whereby to pass through the slot and rise in the separator tube toward the outlet.

It will be observed that both the injector and the degassing separator are always under pressure while the system is operating. The system is filled with water, or whatever liquid is being treated, and with the undissolved gases in the liquid, and with the gases injected by the injector. Until after the treatment is completed, there is no exposure of the treated liquid to the atmosphere. In operation, the system is flooded and a pressurized flow of liquid is provided to the injector, either in the main conduit when there is no branch conduit, or in the branch conduit if one is used.

A negative pressure relative to atmosphere is developed in the injector, and treatment gas is drawn into the stream. Most of the treatment gas which is dissolved will go into solution in the injector. Preferably some additional length of conduit will provided so that there will be enough residence time for more of the treatment gas to be dissolved in the stream.

If desired, a constricting nozzle 150, such as a tapered conical nozzle can be placed in this segment to increase the compression on the stream momentarily, so as to increase the tendency of the gas to dissolve. This is optional. This nozzle 150 has a conical section 151 which converges in the direction of flow.

After passing through this intermediate section of conduitry, the stream enters the degassing separator, in which the undissolved gases will be separated and released, and the treated liquid will be passed to a system for use.

The gas exiting the separator will, if necessary, be conveyed to treatment means to remove gases which are not acceptable for discharge into the atmosphere. An ozone destructor to dispose of ozone is an example. There are many types of such destructors, heated chambers exemplifying one type. Other gases may instead be treated by bubbling through a reactive solution. Thereafter the purified gases are released to the atmosphere.

As to ozone, because it is held under pressure in the system, its solubility will be increased. It reacts quickly and is generally neutralized after the treatment process is completed. Accordingly it has been found that much higher concentrations of ozone can be used for gas feed than in previously known systems. Concentrations as high as 15% can be used, compared to the 2% to 6% concentration that is customarily used. A remarkable increase in mass transfer and dosing capabilities into solution is attainable. With ozone, mass transfer efficiencies of 95 to 99% are attainable. With oxygen, transfer efficiencies of 85% and up are attainable. There is a considerable reduction of equipment cost because of this feature, and it renders the system useful for installations as small as home spas and as large as municipal water works.

This invention is not to be limited by the embodiments shown in the drawings and described in the description which are given by way of example and not of limitation, but only in accordance with the scope of the appended claims.

I claim:

1. The process for increasing the concentration of a treatment gas in a liquid stream, which stream is substantially devoid of a gas phase and of undissolved gases, said process comprising the following steps in the order recited:

a. utilizing a gas-inducing injector having an inlet port, an inlet section, a constricting section, a substantially cylindrical throat, an expansion section, and an outlet port in that order, and an injector port entering said throat, said sections being so proportioned and arranged as to create a reduced pressure in said throat when said liquid stream flows through from inlet port to outlet port, flowing said stream through said injector and injecting treatment gas into said stream through said injector port;

passing the stream from said injector through a conduit to a liquid/gas separator, whereby the stream provided to the liquid/gas separator includes dissolved treatment gas, and a gas phase which includes treatment gas which was not dissolved said conduit having a length selected to provide enough residence time for the intended liquid/gas exchange to occur;

said liquid/gas separator having a substantially cylindrical inner chamber and nozzle means proportioned and arranged so as to discharge said stream tangentially along said wall to create a swirling centrifugal flow, a liquid drain port, a perforated gas separator tube extending centrally in said chamber to receive said gas phase, and a gas relief port opening into said separator tube, flowing the stream from said injector to said nozzle means to create a said centrifugal swirling flow along said wall thereby to separate said gas phase from said stream and produce a stream without significant undissolved gas; and withdrawing separated gas from said separator tube, and liquid from said liquid drain port, while maintaining said stream from the inlet port of the injector to the gas relief port and the liquid drain port of the separator at pressures above atmosphere, except in said injector.

2. A process according to claim 1 in which liquid from said liquid drain port passes through a back-pressure regulator which maintains said back-pressure in said process.

3. A system for injecting treatment gas into a liquid stream that is substantially devoid of undissolved gas for the purpose of dissolving a substantial amount of treatment gas into said liquid stream, and thereafter removing excess of said treatment gas along with other gases which may have been removed from said stream to produce a liquid stream without substantial undissolved gas, with a substantial concentration of said treatment gas, and with a reduced concentration of objectionable gases which may have been dissolved in said liquid stream;

said system comprising:

a source of said liquid stream under pressure;

an induced gas injector comprising a body, said body having a passage therethrough, said body having an inlet port and an outlet port, said passage having an inlet section communicating directly with said inlet port, an outlet section communicating directly with said outlet port, a constricting section, a generally cylindrical throat section, and an enlarging section in that order between said inlet section and said outlet section, an injector suction port through said body opening into said throat section, said constricting section and throat section being so proportioned as to form a local region of reduced pressure in said throat;

a source of treatment gas, said source of treatment gas being in fluid communication with said injector suction port;

a liquid/gas separator having an inlet port in fluid communication with the outlet port of said injector, an outlet port to release liquid from which the gas has been separated, and a gas relief port to release gas that has been separated from the stream, said separator comprising a case forming a cylindrical inner chamber with a chamber wall having a linear axis, said chamber having an inlet port of the separator and directing flow of said fluid in a tangential path on said chamber wall near said inlet end whereby to produce a whirling stream flowing toward said outlet end, said outlet port of said separator entering said chamber near said outlet end, a gas separator tube extending axially and centrally in said chamber from said inlet end, said separator tube being hollow and having a plurality of perforations therethrough along its length, there being a substantial annular spacing between said separator tube and said chamber wall, said case having said gas relief port entering said chamber inside said separator tube to release gas separated from the stream;

conduit means interconnecting said outlet port of said injector to said inlet port of said separator said conduit means having a length selected to provide enough residence time for the intended liquid/gas exchange to occur;

a gas relief valve in said gas relief port; and said system being adapted for operation at pressures above atmospheric, and being closed between the inlet port of the injector and the outlet port and the gas relief port of the separator except at the injector port of said injector.

4. A system according to claim 3 in which said injector and separator are plumbed in series with one another.

5. A system according to claim 3 in which said injector and separator are plumbed in series with one another in a branch conduit exiting from and re-entering a main conduit.

6. A system according to claim 3 in which said injector is disposed in a branch conduit which exits from and re-enters a main conduit, said separator being disposed downstream from the re-entering junction of the branch conduit into said main conduit.

7. A system according to claim 3 in which a gas relief valve is placed in said gas port to control release of gas from said chamber.

8. A system according to claim 7 in which gas treatment means receives gas from said gas port to eliminate objectionable gases.

9. A system according to claim 3 in which a back-pressure regulator in said outlet port of said separator maintains said back-pressure in the system.

* * * * *